(12) United States Patent
Cheng et al.

(10) Patent No.: US 9,690,158 B2
(45) Date of Patent: Jun. 27, 2017

(54) ARRAY SUBSTRATE AND DISPLAY PANEL

(71) Applicant: BOE TECHNOLOGY GROUP CO., LTD., Beijing (CN)

(72) Inventors: Hongfei Cheng, Beijing (CN); Jianbo Xian, Beijing (CN); Yong Qiao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 14/908,378

(22) PCT Filed: Aug. 18, 2015

(86) PCT No.: PCT/CN2015/087339
§ 371 (c)(1),
(2) Date: Jan. 28, 2016

(87) PCT Pub. No.: WO2016/141676
PCT Pub. Date: Sep. 15, 2016

(65) Prior Publication Data
US 2017/0038655 A1 Feb. 9, 2017

(30) Foreign Application Priority Data

Mar. 6, 2015 (CN) .................... 2015 2 0130709 U

(51) Int. Cl.
*G02F 1/1362* (2006.01)
*G02F 1/1343* (2006.01)
*G02F 1/1335* (2006.01)

(52) U.S. Cl.
CPC ...... *G02F 1/136286* (2013.01); *G02F 1/1343* (2013.01); *G02F 1/133514* (2013.01);
(Continued)

(58) Field of Classification Search
CPC ......... G02F 1/136286; G02F 1/133514; G02F 1/134309; G02F 2201/123; G02F 2001/134345
See application file for complete search history.

(56) References Cited

U.S. PATENT DOCUMENTS

2008/0002089 A1    1/2008  Lee et al.
2009/0244425 A1*  10/2009  Jung ................ G02F 1/133753
                                                                349/48
2015/0062506 A1*   3/2015  Cho ................. G02F 1/133514
                                                                349/106

FOREIGN PATENT DOCUMENTS

CN    101201515 A    6/2008
CN    101546073 A    9/2009
(Continued)

OTHER PUBLICATIONS

International Search Report dated Dec. 15, 2015 corresponding to International application No. PCT/CN2015/087339.
(Continued)

*Primary Examiner* — Michael Jung
*Assistant Examiner* — Charles R Peters
(74) *Attorney, Agent, or Firm* — Nath, Goldberg & Meyer; Joshua B. Goldberg; Christopher Thomas

(57) ABSTRACT

The present invention discloses an array substrate and a display panel. The array substrate comprises a plurality of data lines and a plurality of gate lines which are provided to intersect each other. The data lines are provided in parallel and the gate lines are provided in parallel, and the data lines and the gate lines vertically intersect to divide the array substrate into a plurality of pixel units each having a pixel electrode provided therein. The pixel electrode comprises a sub-pixel electrode comprising a root portion and a branch portion group connected to the root portion, the branch portion group consisting of a plurality of branch portions,
(Continued)

adjacent ones of which are separated by slits. The branch portion group partially overlaps the data lines and/or the gate lines.

11 Claims, 5 Drawing Sheets

(52) U.S. Cl.
  CPC ............... *G02F 1/134309* (2013.01); *G02F 2001/134345* (2013.01); *G02F 2201/123* (2013.01)

(56) References Cited

FOREIGN PATENT DOCUMENTS

| | | |
|---|---|---|
| CN | 102375275 A | 3/2012 |
| CN | 204166255 U | 2/2015 |

OTHER PUBLICATIONS

Written Opinion of the International Searching Authority dated Dec. 15, 2015 corresponding to International application No. PCT/CN2015/087339.

* cited by examiner

ARRAY SUBSTRATE AND DISPLAY PANEL

This is a National Phase Application filed under 35 U.S.C. 371 as a national stage of PCT/CN2015/087339, filed Aug. 18, 2015, an application claiming the benefit of Chinese Application No. 201520130709.3, filed Mar. 6, 2015, the content of each of which is hereby incorporated by reference in its entirety.

FIELD OF THE INVENTION

The present invention relates to the field of display technology, and particularly to an array substrate and a display panel including the array substrate.

BACKGROUND OF THE INVENTION

Liquid crystal display technology has been widely used in fields of televisions, mobile phones, public information displays and the like. At present, the liquid crystal display may be mainly classified into a twisted nematic (TN) mode, a vertical-aligned (VA) mode and an in-plane switching (WS) mode. For the liquid crystal display in the vertical-aligned mode, the contrast ratio of display is high and liquid crystal arrangement of 8 domains can be achieved, thereby realizing a wide view angle. Hence, the liquid crystal display in the vertical-aligned mode has been widely used in large-size liquid crystal televisions.

The liquid crystal display panel mainly consists of an array substrate and a color filter substrate in a cell-aligned manner. The array substrate includes a plurality of gate lines and a plurality of data lines which vertically intersect (as the gate lines and the data lines are positioned in different layers, they will not be electrically connected at intersections) to divide the array substrate into a plurality of pixel units each having a thin-film transistor (including a gate, a source and a drain) provided therein, and a signal voltage on the data line is written into a pixel electrode through the thin-film transistor.

In practical applications, the present array substrate inevitably has the following problems:

The pixel electrode realizing multi-domain liquid crystals generally has a root portion and a branch portion, wherein the branch portion is used for controlling the arrangement of liquid crystal molecules, for example, controlling the orientation direction and the orientation stability and the like of the liquid crystal molecules. However, the electric field of the branch portion and the electric field of the data lines or the gate lines often interfere with each other to result in an abnormal arrangement of the liquid crystal molecules, thereby reducing the transmittance of the array substrate and reducing the contrast ratio.

SUMMARY OF THE INVENTION

An objective of the present invention is to provide an array substrate and a display panel including the array substrate, which can reduce the interference between the electric field of branch portions of pixel electrodes and the electric field of data lines and/or gate lines, so that the arrangement of the liquid crystal molecules can be controlled better.

In order to solve the technical problem, as a first aspect of the present invention, an array substrate is provided, including a plurality of data lines and a plurality of gate lines which are provided to intersect each other, the data lines are provided in parallel and the gate lines are provided in parallel, and the data lines and the gate lines vertically intersect to divide the array substrate into a plurality of pixel units each having a pixel electrode provided therein; the pixel electrode includes a sub-pixel electrode including a root portion and a branch portion group connected to the root portion, the branch portion group consisting of a plurality of branch portions, adjacent ones of which are separated by slits; and the branch portion group partially overlaps the data lines and/or the gate lines.

In embodiments, each of the pixel electrodes comprises one or more sub-pixel electrodes, and in the case where there are a plurality of sub-pixel electrodes in each of the pixel electrodes, the plurality of sub-pixel electrodes are provided in a direction parallel to the data lines.

Preferably, at least one of the sub-pixel electrodes in each of the pixel electrodes further includes a connection portion, and the connection portion is used for connecting ends of all the branch portions of the sub-pixel electrodes facing the data lines to each other; or connecting ends of a portion of adjacent branch portions of the sub-pixel electrodes facing the data lines to each other.

Preferably, the branch portion group of at least one of the sub-pixel electrodes in each of the pixel electrodes partially overlaps the gate line adjacent to the branch portion group.

Preferably, the branch portion group of at least one of the sub-pixel electrodes in each of the pixel electrodes partially overlaps at least one of the two gate lines adjacent to the branch portion group.

Preferably, the slits in at least one of the sub-pixel electrodes in each of the pixel electrodes and the slits in sub-pixel electrodes adjacent to the sub-pixel electrodes may be provided oppositely, the sub-pixel electrodes and the adjacent sub-pixel electrodes being defined by the same gate lines and different data lines.

Alternatively, the slits in at least one of the sub-pixel electrodes in each of the pixel electrodes and the slits in sub-pixel electrodes adjacent to the sub-pixel electrodes may be provided in a staggered manner, the sub-pixel electrodes and the adjacent sub-pixel electrodes being defined by the same gate lines and different data lines.

Preferably, the array substrate further includes a resin layer provided between the pixel electrodes and the data lines.

Further preferably, the thickness of the resin layer ranges from 0.5 μm to 5 μm.

Preferably, the array substrate further includes a resin layer provided between the pixel electrodes and the data lines.

Further preferably, the thickness of the resin layer ranges from 0.5 μm to 3 μm.

As a second aspect of the present invention, a display panel is further provided, including an array substrate and a cell-aligned substrate which is provided in a cell-aligned manner with respect to the array substrate, and the array substrate is the array substrate provided by the present invention.

In the array substrate provided in embodiments of the present invention, as the branch portion group of the sub-pixel electrode partially overlaps the data lines and/or the gate lines, the interference between the electric field of the branch portion group of the sub-pixel electrodes and the electric field of the data lines and/or the gate lines may be reduced, so that the arrangement of the liquid crystal molecules can be controlled better, which may further improve the transmittance of the array substrate and increase the contrast ratio, thereby improving the display quality of the display panel including the array substrate.

In the display panel provided in the embodiments of the present invention, by employing the aforementioned array substrate, the arrangement of the liquid crystal molecules can be controlled better, thereby improving the transmittance of the array substrate and increasing the contrast ratio, and improving the display quality of the display panel including the array substrate.

BRIEF DESCRIPTION OF THE DRAWINGS

The accompanying drawings are used for providing further understanding of the present invention, constitute a part of the specification, and are used for explaining the present invention together with following specific implementations but not intended to limit the present invention.

DETAILED DESCRIPTION OF THE EMBODIMENTS

The specific implementations of the present invention will be described in detail below with reference to the accompanying drawings. It should be understood that the specific implementations described herein are merely used for describing and explaining the present invention, but not intended to limit the present invention.

The array substrate provided by the present invention includes a plurality of data lines and a plurality of gate lines which are provided to intersect each other, the data lines are provided in parallel and the gate lines are provided in parallel, and the data lines and the gate lines vertically intersect to divide the array substrate into a plurality of pixel units each having a pixel electrode provided therein; and the pixel electrode includes a sub-pixel electrode including a root portion and a branch portion group connected to the root portion, the branch portion group consisting of a plurality of branch portions, adjacent ones of which are separated by slits. With the root portion and the branch portion group connected thereto, the multi-domain liquid crystal arrangement may be realized. Furthermore, as the branch portion group of the sub-pixel electrode partially overlaps the data lines and/or the gate lines, the interference between the electric field of the branch portion group of the sub-pixel electrodes and the electric field of the data lines and/or the gate lines may be reduced, so that the arrangement of the liquid crystal molecules can be controlled better, which may further improve the transmittance of the array substrate and increase the contrast ratio, thereby improving the display quality of a display panel including the array substrate.

In practical applications, for the pixel electrode in each of the electrode units, there may be one or more sub-pixel electrodes, and in the case where there are a plurality of sub-pixel electrodes in each of the pixel electrodes, the plurality of sub-pixel electrodes are provided in a direction parallel to the data lines.

Figure 1A:
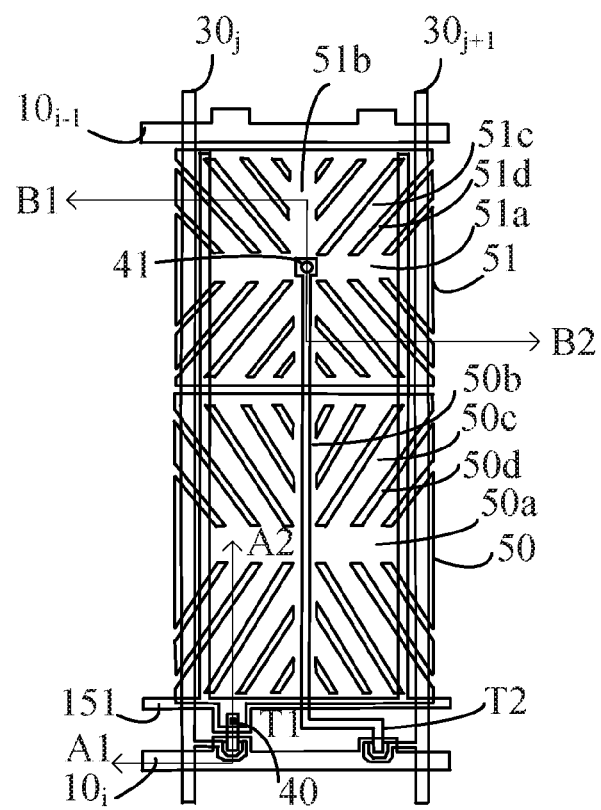
FIG. 1A is a schematic plan view of a single pixel electrode of an array substrate provided by an embodiment of the present invention.
Figure 1B:
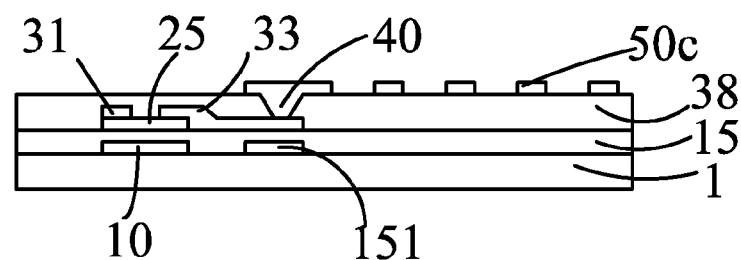
FIG. 1B is a cross-sectional view along a line A1-A2 of FIG. 1A.
Figure 1C:
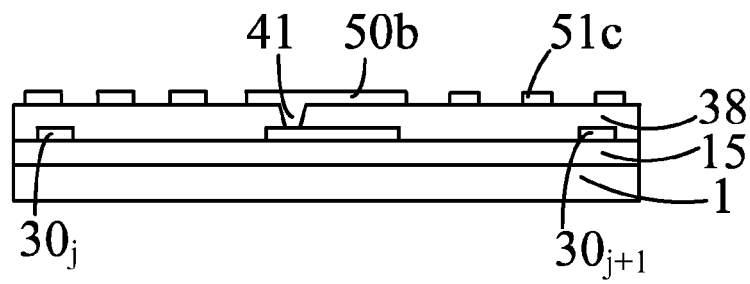
FIG. 1C is a cross-sectional view along a line B1-B2 of FIG. 1A.

The specific implementation of the pixel electrode employed in this embodiment will be described in detail below. Specifically, FIG. 1A is a schematic plan view of a single pixel electrode of an array substrate provided by an embodiment of the present invention. FIG. 1B is a cross-sectional view along a line A1-A2 of FIG. 1A. 1C is a cross-sectional view along a line B1-B2 of FIG. 1A. Referring to FIG. 1A to FIG. 1C at the same time, the array substrate in this embodiment includes a plurality of data lines 30 and a plurality of gate lines 10 which are provided to intersect each other, wherein the plurality of gate lines 10 are respectively $10_1, 10_2, \ldots, 10_i, 10_{i+1}, \ldots$, and the gate lines 10 may employ a single layer structure or may also employ a multi-layer structure, and are made of Mo\Al\Mo, Ti\Cu\Ti or Mo\Ti\Cu or the like. The plurality of data lines 30 are respectively $30_1, 30_2, \ldots, 30_j, 30_{j+1}, \ldots$.

In this embodiment, the pixel electrode is defined by one gate line $10_i$ and two adjacent data lines $30_j$ and $30_{j+1}$, the pixel electrode includes two sub-pixel electrodes provided in a direction parallel to the data lines 30, namely a first sub-pixel electrode 50 and a second sub-pixel electrode 51 respectively, each including a root portion and a branch portion group connected to the root portion. The root portion of the first sub-pixel electrode 50 includes a root portion 50a parallel to the gate lines 10 and a root portion 50b parallel to the data lines 30, the root portions 50a and 50b intersecting in a cross shape. Similarly, the root portion of the second sub-pixel electrode 51 includes a root portion 51a parallel to the gate lines 10 and a root portion 51b parallel to the data lines 30, the root portions 51a and 51b intersecting in a cross shape.

The branch portion group of the first sub-pixel electrode 50 consists of a plurality of branch portions 50c each connected to the root portion 50a or the root portion 50b, and adjacent branch portions 50c are separated by slits 50d. The branch portion group of the second sub-pixel electrode 51 consists of a plurality of branch portions 51c each connected to the root portion 51a or the root portion 51b, and adjacent branch portions 51c are separated by slits 51d. With the root portion and the branch portion group connected thereto, the liquid crystal arrangement of 8 domains may be realized, as shown in FIG. 1A.

In this embodiment, the branch portion groups of the two sub-pixel electrodes (50, 51) partially overlap two data lines ($30_j$, $30_{j+1}$) adjacent thereto, so as to reduce the interference between the electric field of the branch portion groups of the two sub-pixel electrodes and the electric field of the two data lines ($30_j$, $30_{j+1}$). That the branch portion groups partially overlap the data lines means that the orthographic projections of the branch portion groups and the data lines on a substrate of the array substrate have overlapped parts and non-overlapped parts, and the branch portion groups partially overlap the data lines in the following two manners: in the first manner, outer ends of the branch portions extend beyond outer edges of the data lines, as shown in FIG. 1A; and in the second manner, the outer ends of the branch portions merely extend to positions beyond inner edges of the data lines but not beyond the outer edges of the data lines.

In practical applications, according to different requirements, only the branch portion group of the first sub-pixel electrode 50 or the second sub-pixel electrode 51 may individually partially overlap two data lines ($30_j$, $30_{j+1}$) adjacent to the branch portion group; alternatively, the branch portion group(s) of the first sub-pixel electrode 50 and/or the second sub-pixel electrode 51 may individually partially overlap the data line $30_j$ or the data line $30_{j+1}$.

In this embodiment, the first sub-pixel electrode 50 is electrically connected to the data line $30_j$ through a first thin-film transistor T1; and the second sub-pixel electrode 51 is electrically connected to the data line $30_{j+1}$ adjacent thereto through a second thin-film transistor T2. Specifically, a source 31 of the first thin-film transistor T1 is connected to the data line $30_j$, and a drain 33 of the first thin-film transistor T1 is connected to the first sub-pixel electrode 50 through a via hole 40; and a source of the second thin-film transistor T2 is connected to the adjacent data line $30_{j+1}$, and a drain of the second thin-film transistor T2 is connected to the second sub-pixel electrode 51 through a via hole 41.

In this embodiment, the array substrate further includes a substrate 1, a gate insulation layer 15 and a passivation layer 38 sequentially provided from bottom to top, wherein the gate lines 10 and a common electrode 151 are provided between the substrate 1 and the gate insulation layer 15; an active layer 25, the source 31 and the drain 33 of the thin-film transistor are provided between the gate insulation layer 15 and the passivation layer 38; and the sub-pixel electrodes (50, 51) are provided on the passivation layer 38. Preferably, the array substrate may further include a resin layer, which may be provided between the pixel electrodes and the data lines 30, for example, provided between the pixel electrodes and the passivation layer 38, and may also be provided between the data lines 30 and the passivation layer 38, and the thickness of the resin layer ranges from 0.5 μm to 5 μm, preferably from 1 μm to 3 μm. With the resin layer, the influence of the electric field of the data lines 30 on the pixel electrodes may be further reduced.

In this embodiment, the array substrate may further be provided with a color filter layer, the color filter layer may be provided between the pixel electrodes and the data lines 30, for example, provided between the pixel electrodes and the passivation layer 38, and may also be provided between the data lines 30 and the passivation layer 38, and the thickness of the color filter layer ranges from 0.5 μm to 3 μm, preferably from 1 μm to 2.5 μm. With the color filter layer, not only may the alignment tolerance of the array substrate and an opposite substrate be reduced, but also the influence of the electric field of the data lines 30 on the pixel electrodes may be further reduced.

Figure 2:
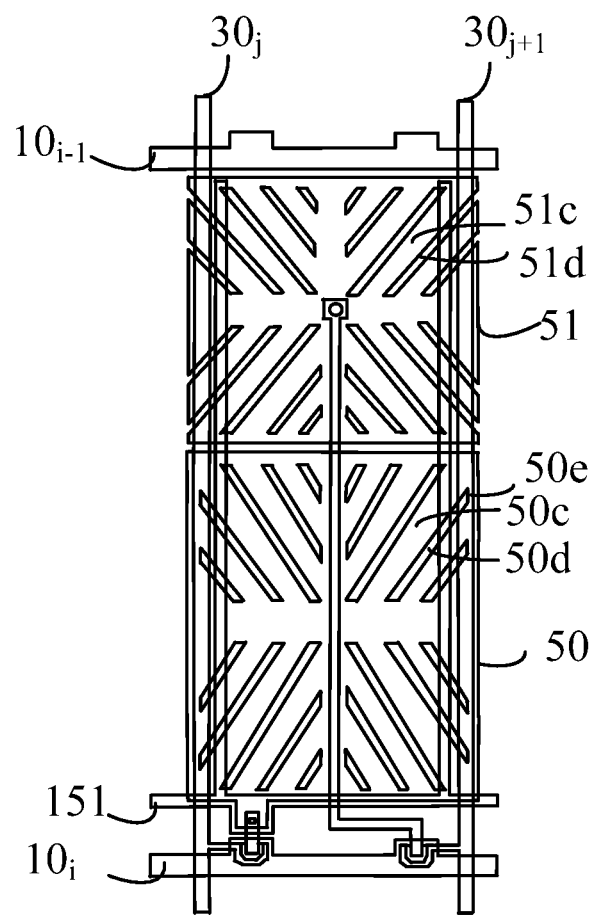
FIG. 2 is a schematic plan view of a single pixel electrode of another array substrate provided by an embodiment of the present invention.

FIG. 2 is a schematic plan view of a single pixel electrode of another array substrate provided by an embodiment of the present invention. Referring to FIG. 2, the array substrate is a further improvement on the array substrate in the aforementioned embodiment, that is, the first sub-pixel electrode 50 further includes a connection portion 50e.

Specifically, the connection portion 50e is used for connecting ends of all the branch portions 50c of the first sub-pixel electrode 50 respectively facing two sides of the data line $30_j$ and the data line $30_{j+1}$ to each other, that is, the branch portions 50c of the first sub-pixel electrode 50 are connected to each other at edges on the left side and the right side of the first sub-pixel electrode 50 in FIG. 2 through the connection portion 50e. With the connection portion 50e, the electric field produced by the branch portions 50c may be adjusted. In practical applications, according to different requirements, the connection portion may be provided on only the first sub-pixel electrode 50 or the second sub-pixel electrode 51, alternatively, the connection portion can be provided on both the first sub-pixel electrode 50 and the second sub-pixel electrode 51. Additionally, in practical applications, it is also possible for the connection portion 50e to connect all ends of the branch portions 50c of the first sub-pixel electrode 50 facing only the data line $30_j$ or the data line $30_{j+1}$ to each other.

Figure 3A:
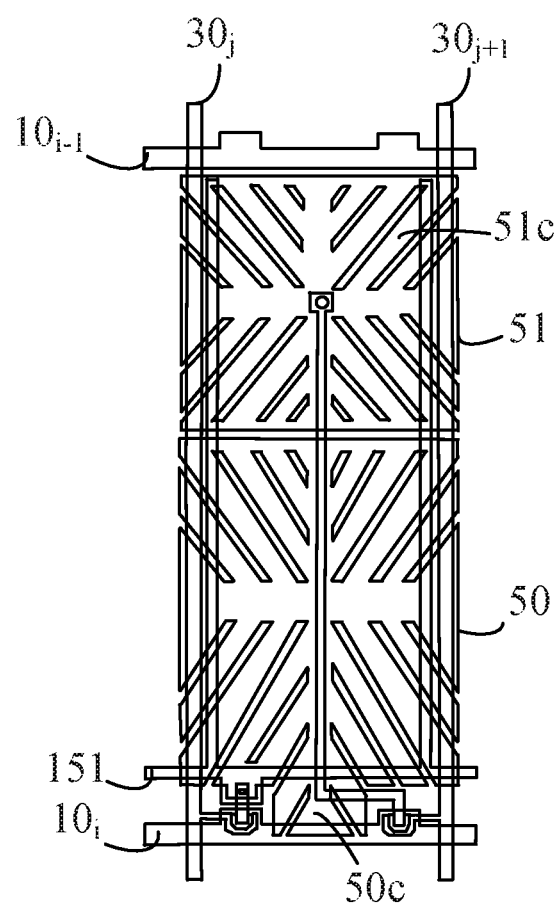
FIG. 3A is a schematic plan view of a single pixel electrode of still another array substrate provided by an embodiment of the present invention.

It is to be noted that, in this embodiment, the connection portion 50e connect ends of all the branch portions 50c of the first sub-pixel electrode 50 respectively facing two sides of the data line $30_j$ and the data line $30_{j+1}$ to each other. However, the present invention is not limited thereto. In practical applications, it is also possible for the connection portion 50e to only connect ends of a portion of adjacent branch portions of the first sub-pixel electrode 50 facing the data lines to each other. FIG. 3A is a schematic plan view of a single pixel electrode of still another array substrate provided by an embodiment of the present invention. Referring to FIG. 3A, the array substrate is a further improvement on the array substrates in any one of the aforementioned embodiments. Specifically, in this embodiment, the branch portion group of the first sub-pixel electrode 50 is adjacent to the gate line $10_i$, and partially overlaps the gate line $10_1$, so as to reduce the interference between the electric field of the branch portion group of the first sub-pixel electrode 50 and the electric field of the gate line $10_i$.

Figure 3B:
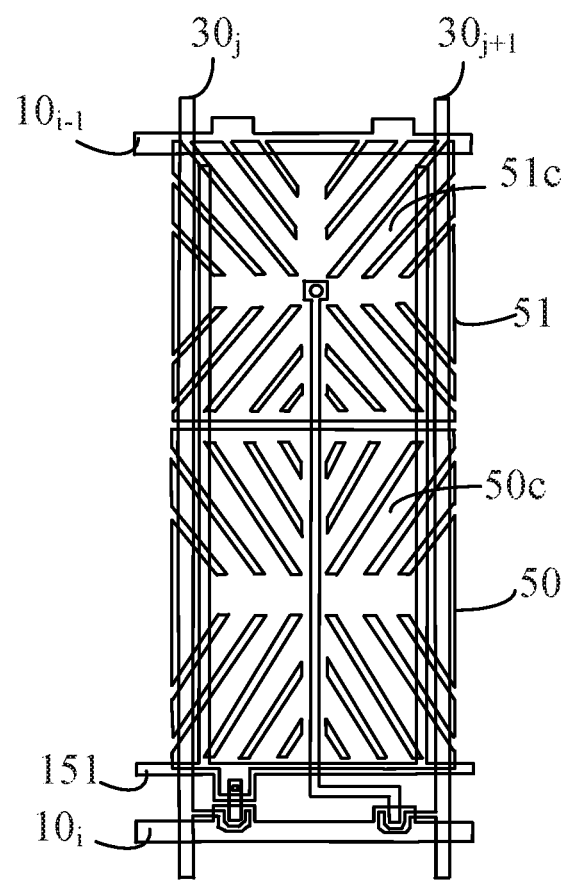
FIG. 3B is a schematic plan view of a single pixel electrode of yet another array substrate provided by an embodiment of the present invention.

Of course, in practical applications, as shown in FIG. 3B, the branch portion group of the second sub-pixel electrode 51 may also partially overlap the gate line $10_{i-1}$ adjacent to the second sub-pixel electrode 51. Alternatively, the branch portion groups of the first sub-pixel electrode 50 and the second sub-pixel electrode 51 may further partially overlap the gate line $10_i$ and the gate line $10_{i-1}$, respectively.

It is to be noted that, that the branch portion groups partially overlap the gate lines means that the orthographic projections of the branch portion groups and the gate lines on the substrate of the array substrate have overlapped parts and non-overlapped parts, and the branch portion groups partially overlap the gate lines in the following two manners: in the first manner, outer ends of the branch portions extend to positions beyond inner edges of the gate lines, but not beyond the outer edges of the gate lines, as shown in FIGS. 3A and 3B; and in the second manner, the outer ends of the branch portions extend beyond the outer edges of the gate lines.

Figure 4A:
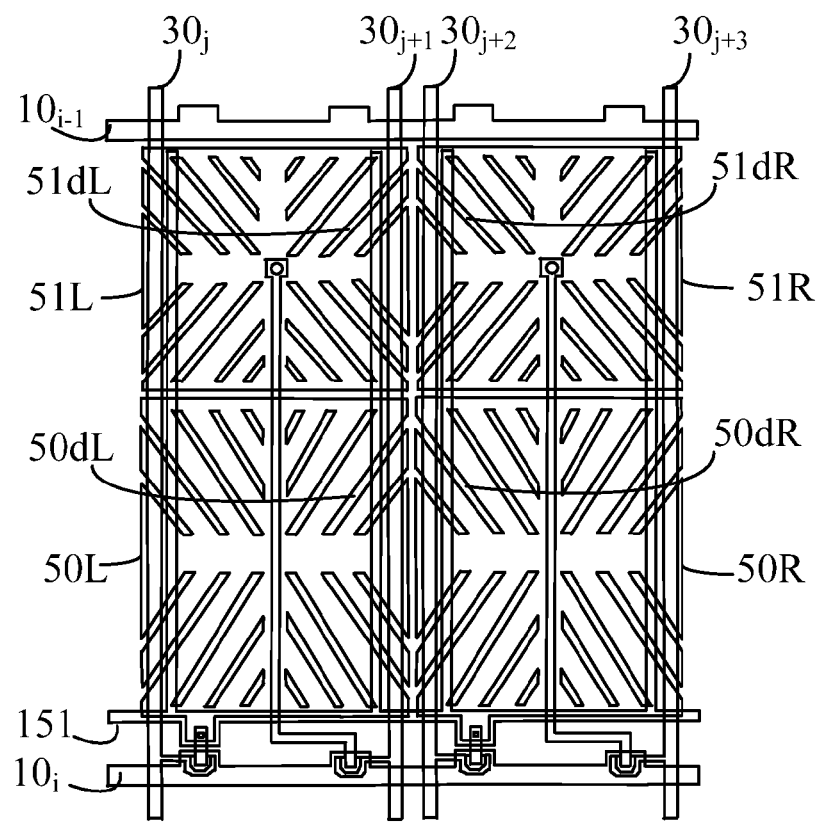
FIG. 4A is a schematic plan view of two adjacent pixel electrodes of an array substrate provided by an embodiment of the present invention.

FIG. 4A is a schematic plan view of two adjacent pixel electrodes of an array substrate provided by an embodiment of the present invention. Referring to FIG. 4A, the array substrate is a further improvement on the array substrates in any one of the aforementioned embodiments. Specifically, a first sub-pixel electrode 50L and a second sub-pixel electrode 51L are defined by one gate line $10_i$ and two adjacent data lines $30_j$ and $30_{j+1}$; a first sub-pixel electrode 50R and a second sub-pixel electrode 51R are defined by one gate line $10_i$ and two adjacent data lines $30_{j+2}$ and $30_{j+3}$; and wherein the first sub-pixel electrode 50L and the first sub-pixel electrode 50R are adjacent to each other and defined by the same gate line (i.e., the gate line $10_i$) and different data lines ($30_j$ and $30_{j+1}$, and $30_{j+2}$ and $30_{j+3}$), and the slits therein are respectively slits 50dL and slits 50dR provided oppositely, that is, the opening of the slit 50dL directly faces the opening of the slit 50dR. Similarly, the second sub-pixel electrode 5 IL and the second sub-pixel electrode 51R are adjacent to each other and defined by the same gate line i.e., the gate line $10_i$) and different data lines ($30_j$ and $30_{j+1}$, and $30_{j+2}$ and $30_{j+3}$), and the slits therein are respectively slits $51d$L and slits $51d$R provided oppositely.

Figure 4B:
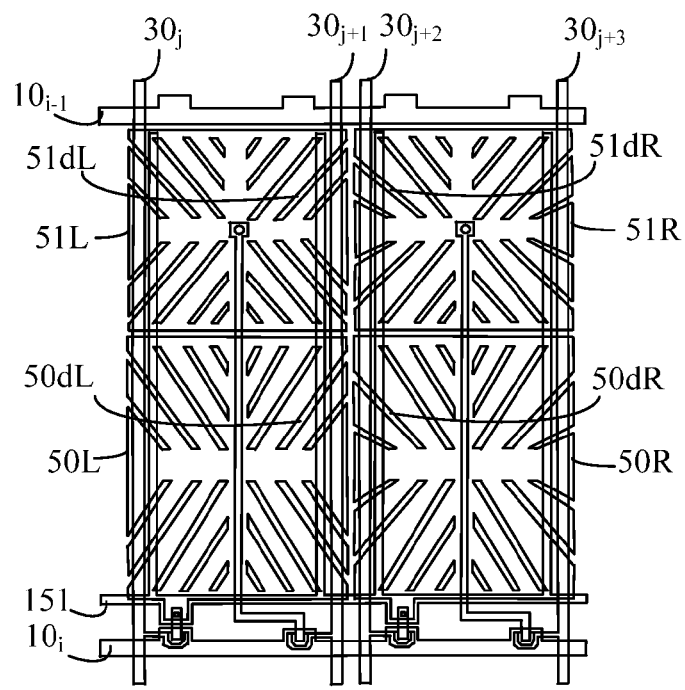
FIG. 4B is a schematic plan view of two adjacent pixel electrodes of another array substrate provided by an embodiment of the present invention.

Preferably, as shown in FIG. 4B, the slit $50d$L and the slit $50d$R may also be provided in a staggered manner, that is, the opening of the slit $50d$L and the opening of the slit $50d$R are staggered; and meanwhile, the slit $51d$L and the slit $51d$R are provided in such a staggered manner that the electric fields of two adjacent pixel electrodes may be prevent from interfering with each other.

In practical applications, according to specific conditions, the slits in any two adjacent sub-pixel electrodes defined by the same gate line and different data lines may be provided oppositely or in a staggered manner.

It is to be noted that, in the aforementioned embodiments, there are two sub-pixel electrodes provided in each of the sub-pixel electrodes, but the present invention is not limited thereto. In practical applications, there may also be one or three or more sub-pixel electrodes provided in each of the sub-pixel electrodes, and in a case where there is a plurality of sub-pixel electrodes provided in each of the pixel electrodes, the plurality of sub-pixel electrodes may be provided in a direction parallel to the data lines, or may be provided in any other manner according to requirements.

It is also to be noted that, in this embodiment, for each of the sub-pixel electrodes, the root portion has a cross shape, and the branch portion group is connected to the cross-shaped root portion, but the present invention is not limited thereto. In practical applications, root portions and branch portion groups in any other structures may be employed, and the present invention is not limited thereto.

In conclusion, in the array substrate provided in embodiments of the present invention, as the branch portion group of the sub-pixel electrode partially overlaps the data lines and/or the gate lines, the interference between the electric field of the branch portion group of the sub-pixel electrode and the electric field of the data lines and/or the gate lines may be reduced, so that the arrangement of the liquid crystal molecules can be controlled better, which may further improve the transmittance of the array substrate and increase the contrast ratio, thereby improving the display quality of a display panel including the array substrate.

As another technical solution, an embodiment of the present invention further provides a display panel including an array substrate and a cell-aligned substrate which is provided in a cell-aligned manner with respect to the array substrate, wherein the array substrate is the array substrate provided in the embodiments of the present invention.

In the display panel provided in the embodiment of the present invention, by employing the array substrate provided in the embodiments of the present invention, the arrangement of the liquid crystal molecules can be controlled better, thereby improving the transmittance of the array substrate and increasing the contrast ratio, and improving the display quality of the display panel including the array substrate.

It may be understood that the aforementioned implementations are merely exemplary implementations used for describing the principle of the present invention, but the present invention is not limited thereto. For a person of ordinary skill in the art, various variations and improvements may be made without departing from the spirit and essence of the present invention, and those variations and improvements should also be regarded as falling within the protection scope of the present invention.

The invention claimed is:

1. An array substrate, comprising a plurality of data lines and a plurality of gate lines which are provided to intersect each other, wherein:
   the data lines are provided in parallel and the gate lines are provided in parallel, and the data lines and the gate lines vertically intersect to divide the array substrate into a plurality of pixel units each having a pixel electrode provided therein;
   the pixel electrode comprises a sub-pixel electrode comprising a root portion and a branch portion group connected to the root portion, the branch portion group consisting of a plurality of branch portions, adjacent ones of which are separated by slits; the branch portion group partially overlaps the data lines and/or the gate lines;
   each of the pixel electrodes comprises one or more sub-pixel electrodes, in the case where there are a plurality of sub-pixel electrodes in each of the electrodes, the plurality of sub-pixel electrodes are provided in a direction parallel to the data lines; and
   the slits in at least one of the sub-pixel electrodes in each of the pixel electrodes and the slits in sub-pixel electrodes adjacent to the sub-pixel electrodes are provided in a staggered manner, the sub-pixel electrodes and the adjacent sub-pixel electrodes being defined by the same gate lines and different data lines.

2. The array substrate according to claim 1, wherein at least one of the sub-pixel electrodes in each of the pixel electrodes further comprises a connection portion, and the connection portion is used for connecting ends of all the branch portions of the sub-pixel electrodes facing the data lines to each other.

3. The array substrate according to claim 1, wherein at least one of the sub-pixel electrodes in each of the pixel electrodes further comprises a connection portion, and the connection portion is used for connecting ends of a portion of adjacent branch portions of the sub-pixel electrodes facing the data lines to each other.

4. The array substrate according to claim 1, wherein the branch portion group of at least one of the sub-pixel electrodes in each of the pixel electrodes partially overlaps the gate line adjacent to the branch portion group.

5. The array substrate according to claim 1, wherein the branch portion group of at least one of the sub-pixel electrodes in each of the pixel electrodes partially overlaps at least one of the two gate lines adjacent to the branch portion group.

6. The array substrate according to claim 1, wherein the slits in at least one of the sub-pixel electrodes in each of the pixel electrodes and the slits in sub-pixel electrodes adjacent to the sub-pixel electrodes are provided oppositely, the sub-pixel electrodes and the adjacent sub-pixel electrodes being defined by the same gate lines and different data lines.

7. The array substrate according to claim 1, further comprising a resin layer provided between the pixel electrodes and the data lines.

8. The array substrate according to claim 7, wherein a thickness of the resin layer ranges from 0.5 μm to 5 μm.

9. The array substrate according to claim 1, further comprising a color filter layer provided between the pixel electrodes and the data lines.

10. The array substrate according to claim 9, wherein a thickness of the color filter layer ranges from 0.5 μm to 3 μm.

11. A display panel, comprising the array substrate according to claim 1 and a cell-aligned substrate which is provided in a cell-aligned manner with respect to the array substrate.

* * * * *